United States Patent [19]

Koga

[11] 4,454,174

[45] Jun. 12, 1984

[54] METHOD FOR LINING PIPES OF A PIPELINE

[75] Inventor: Motoyuki Koga, Tokyo, Japan

[73] Assignee: Hakko Co., Ltd., Tokyo, Japan

[21] Appl. No.: 497,463

[22] Filed: May 23, 1983

[30] Foreign Application Priority Data

May 31, 1982 [JP] Japan .................................. 57-92574
May 31, 1982 [JP] Japan .................................. 57-92575
May 31, 1982 [JP] Japan .................................. 57-92576

[51] Int. Cl.³ ............................................. B05D 7/22
[52] U.S. Cl. .................................. 427/237; 427/181; 427/235; 427/238
[58] Field of Search ................ 427/181, 235, 237, 238

[56] References Cited

U.S. PATENT DOCUMENTS 4,327,132  4/1982  Shinno ............................... 427/235

Primary Examiner—James R. Hoffman
Attorney, Agent, or Firm—Martin A. Farber

[57] ABSTRACT

A method for lining pipes of a pipeline. The method is characterized in that at a first stage, mist of plastics having a low viscosity is passed through the pipeline by carrier air at a low pressure, and at a second stage mist of plastics having a high viscosity is carried through the pipeline at a high pressure, thereby to form double layers of plastics on the inner wall of the pipeline.

3 Claims, 4 Drawing Figures

METHOD FOR LINING PIPES OF A PIPELINE

BACKGROUND OF THE INVENTION

The present invention relates to a method for lining pipes of an underground pipeline such as town gas pipeline or water pipeline, and more particularly to a method for lining pipes with plastics in order to repair old pipes.

A conventional lining method for old pipes is that fine droplets of thermosetting plastics such as epoxy resin are carried through the pipes by air stream produced by a compressor or blower, so that the inner walls of the pipes may be coated with the plastics. In the conventional method, the velocity and pressure of carrier air are comparatively high, for example the velocity is 80 m/sec.-100 m/sec. and the pressure is 2 Kg/cm$^2$-7 Kg/cm$^2$. On the other hand, the majority of old pipes are pierced with a plurality of holes caused by corrosion. Accordingly, plastics supplied at a high pressure flows out through the holes, so that the holes are not blocked with the plastics. In addition, it may happen that the holes are expanded or the pipes are broken by the plastics.

In order to eliminate such disadvantages in the conventional method, the inventor has proposed a method for lining pipes in a pipeline comprising connecting an end opening of the pipeline to a vacuum generator, and sucking the air in the pipeline by the vacuum generator together with plastics mist, whereby pipes of the pipeline may be uniformly lined with plastics with the blocking of holes.

However, in such a method, the plastics must be held at a low viscosity, so that the plastics may be carried by carrier air at a low pressure. It will be noted that it is difficult to form a thick lining layer with plastics having a low viscosity. Therefore, it is impossible to reinforce the pipe with the liner to have a necessary strength as a gas pipe.

SUMMARY OF THE INVENTION

The object of the present invention is to provide a method by which pipes of a pipeline can be lined with plastics with the blocking of holes and lined with a thick layer so as to reinforce the pipes to have a necessary strength.

According to the present invention, there is provided a method for lining pipes of a pipeline comprising: connecting an end opening of the pipeline to a compressor and connecting the other end of the pipeline to a vacuum generator; at a first stage, supplying mist of plastics having a low viscosity into the pipeline; producing a carrier air flow in the pipeline at a low pressure by the compressor and vacuum generator; at the next stage, supplying mist of plastics having a high viscosity into the pipeline; and producing carrier air flow in the pipeline at a high pressure.

The present invention will be more apparent from the following description made with reference to the accompanying drawings.

DETAILED DESCRIPTION OF THE PREFERRED EMBODIMENTS

Figure 1:
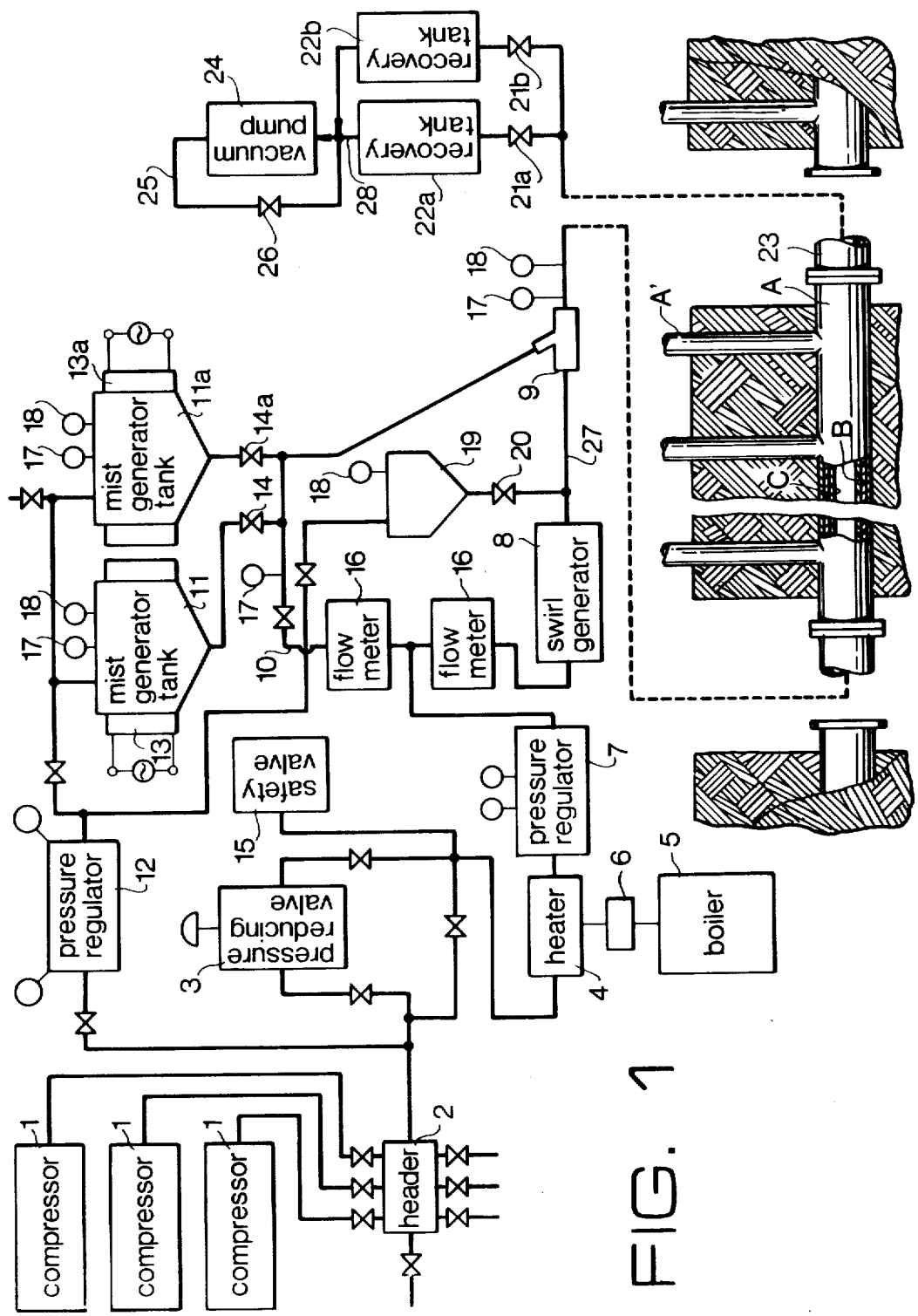
FIG. 1 is a schematic diagram showing a system for using a method according to the present invention.
Figure 2:
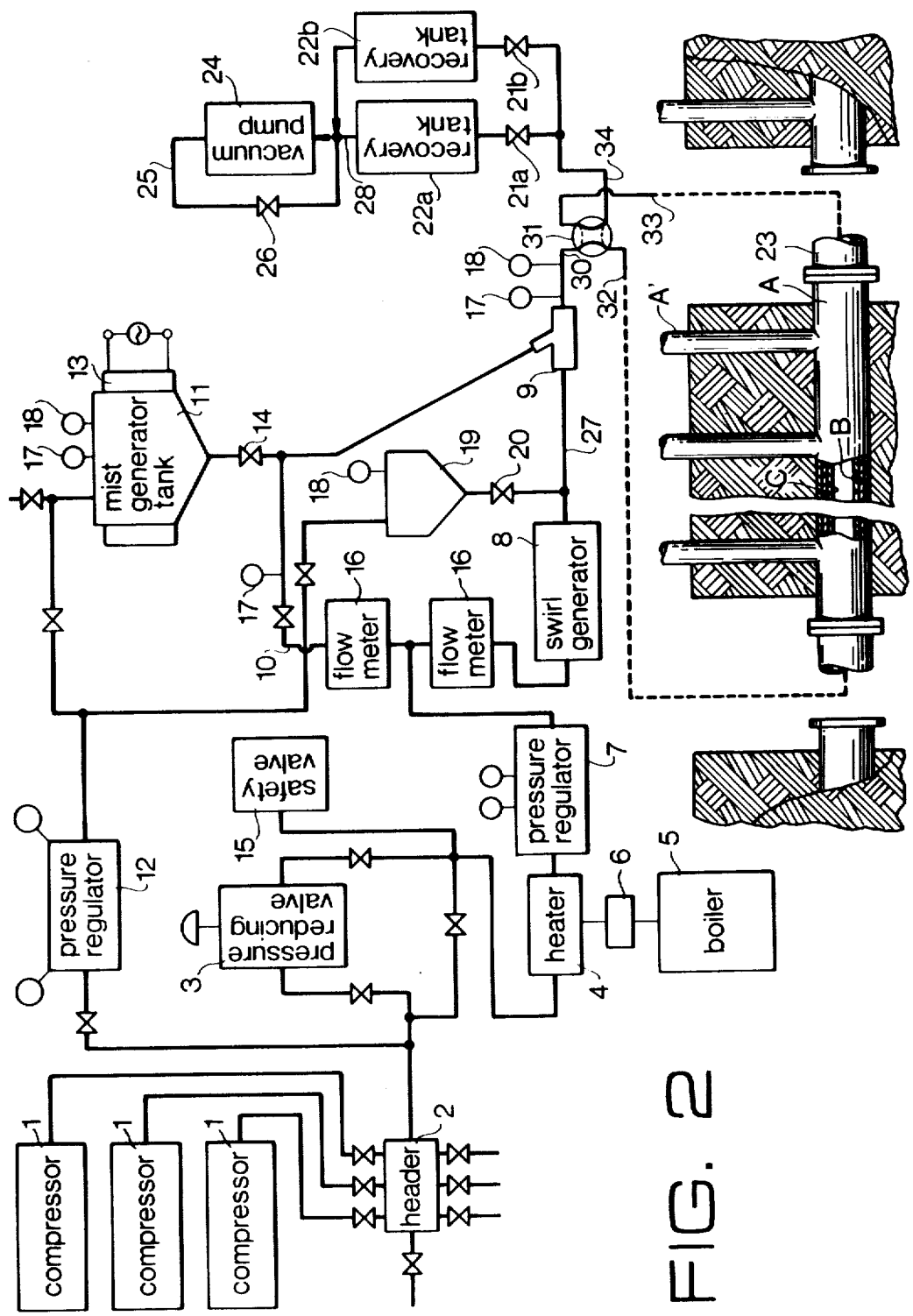
FIG. 2 shows another embodiment of the present invention.
Figure 3:
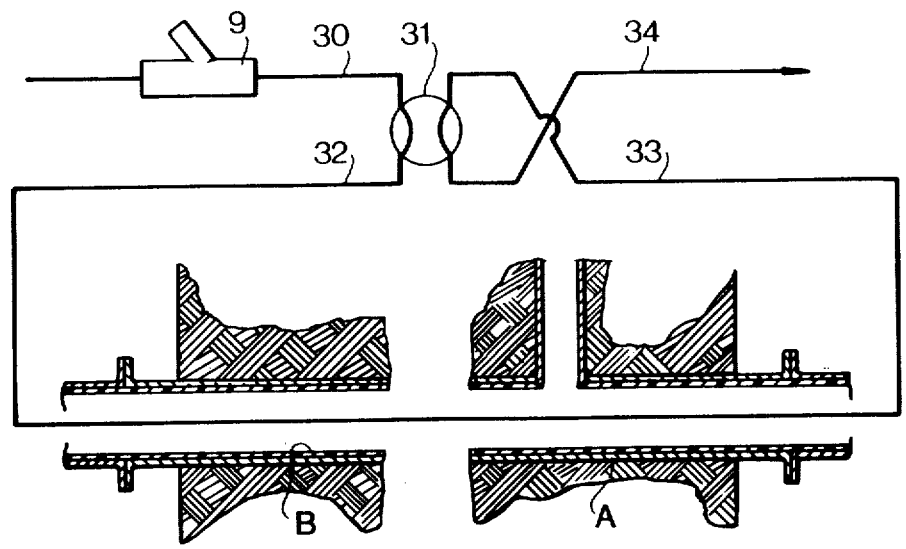
FIGS. 3 and 4 show flow of carrier air in the system of FIG. 2.
Figure 4:
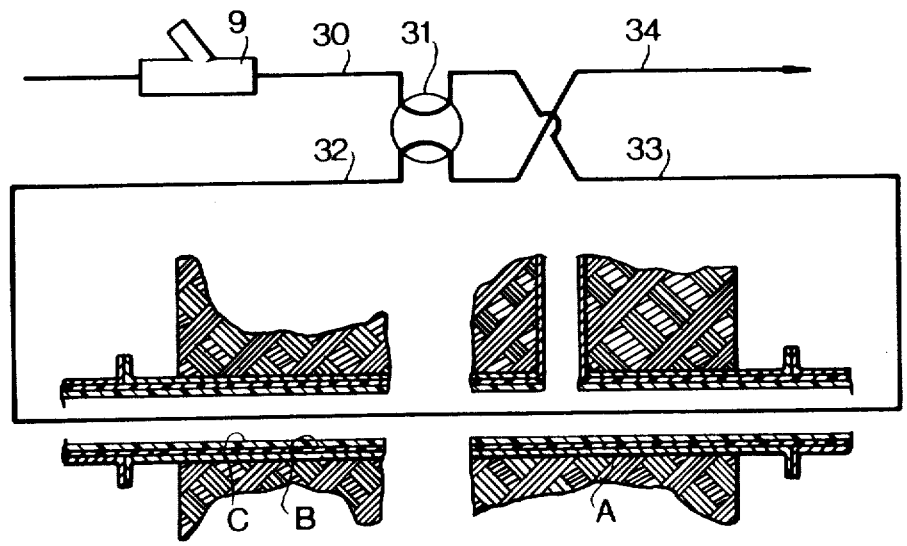

Referring to FIG. 1, the system for a method according to the present invention is provided with compressors 1 for supplying carrier air or gas at a low pressure and a vacuum pump 24 for sucking the air in pipes of an underground pipeline A. Outlets of compressors 1 are connected to a header 2 which is in turn communicated with a heater 4 through a pressure reducing valve 3. The heater 4 comprises a heat exchanger and is supplied with steam from a boiler 5 through a pressure reducing valve 6 so as to heat the air passing therethrough. Thus, the heater 4 supplies hot carrier air at a predetermined pressure. The carrier air is fed to a confluent head 9 through a pressure regulator 7, a volumetric flow meter 16, swirl generator 8 and pipe 27. The head 9 is connected to an end opening of the pipeline A.

On the other hand, a part of compressed air from the header 2 is fed to mist generator tanks 11 and 11a through a pressure regulator 12. In the tanks 11 and 11a, melted thermosetting plastics such as epoxy resin is stored and heated by electric heaters 13 and 13a respectively. The plastics in the tank 11 is kept at a low viscosity and plastics in the tank 11a is kept at a high viscosity. A part of hot carrier air from the heater 4 passes through a pipe 10 and volumetric flow meter 16 to the confluent head 9. The melted plastics in each of tanks 11 and 11a is injected into the pipe 10 by the compressed air from the header 2 through a valve 14 (14a), so that the melted plastics is pulverized in the pipe 10 and carried to the head 9.

The system is further provided with an abrasive grain or grit tank 19 which is communicated with an outlet of the pressure regulator 12 and with the pipe 27 through a valve 20. Grits in the tank 19 are used for grit-blasting inner walls of pipes of the underground pipeline A. The system is further provided with a safety valve 15, pressure meters 17, and thermometers 18. To an end of the pipeline A, a recovery tank 22a for recovering the mist of plastics and a recovery tank 22b for abrasive grain are connected by a pipe 23 through valves 21a and 21b, respectively. The vacuum pump 24 is connected to the tanks 22a and 22b by a pipe 28. A bypass 25 having a valve 26 is connected to the vacuum pump 24.

In operation, the valve 21a is opened and valve 21b is closed. Compressors 1 and vacuum pump 24 are operated to produce air stream in pipeline A. The air is heated by the heater 4, so that inner walls of the pipes are dried and heated.

In case of very old pipes, it is preferable to remove dirt, rust and others from the inner walls of the pipes. To this end, before lining with plastics, the valve 21a is closed and valve 21b is opened, and valve 20 is opened, so that grits in the tank 19 are injected into the pipes by carrier air at a high pressure in order to perform grit-blasting. Grits discharged from the pipeline are recovered in the tank 22b.

In accordance with the present invention, lining operation with plastics is divided into a first stage and second stage. At the first stage, plastics having a low viscosity is carried by the carrier air and passed through the pipeline A as described hereinafter. First, valve 21b is closed, valve 21a is opened, valve 20 is closed, valve 14 is opened, and valve 14a is closed. Thus, air supplied by compressors 1 at a low pressure acts to inject melted plastics in the tank 11 into the pipe 10 to form mist of the plastics. The mist of the plastics is fed to the head 9 and carried to the pipeline A by the hot carrier air supplied from the heater 4. The pressure of the carrier air is adjusted by the pressure regulator 7 to a low pressure, for example $+0.3$ Kg/cm$^2$. On the other hand, the valve 26 is opened. Therefore, the vacuum pump 24 draws air in the pipes to provide a low vacuum pressure, for example, about $-0.3$ Kg/cm$^2$. Thus, the mist of plastics is carried through the pipeline by the carrier air. Thus, a liner B is formed on inner walls of the pipes. Residual mist is recovered in the tank 22a.

Thus, the mist of plastics is carried a long distance of the pipeline by the carrier air. Since the mist is drawn by the vacuum pump 24, the mist through pipes to be treated does not flow into branches A' and does not flow out through holes formed by corrosion of the pipes. Further, carrier air supplied by compressors 1 at low pressure does not cause the mist inducted by the vacuum pump 24 to deflect from the pipeline. Thus, the uniform liner B can be formed on inner walls of the pipes.

At the second stage, the pressure of the carrier air is adjusted by the pressure regulator 7 to a higher value, for example 2–7 Kg/cm$^2$, and valve 14 is closed and valve 14a is opened. Thus, plastics having a higher viscosity is fed into the pipe 10 from the tank 11a and carried to the pipeline A by the carrier air at a higher pressure. Thus, a liner C is formed on the liner B on the inner wall of the pipes.

Since the plastics at second stage has a higher viscosity, a thick layer C can be formed. Further, since holes of pipes are blocked by the first liner B, mist of plastics having a high viscosity can be carried by carrier air at high pressure without flowing out of plastics through the holes. The second stage operation is performed before the first liner B solidifies, mist of plastics during the second stage easily stick to the first liner B to form a thick layer.

According to conditions of the pipeline and effect of the lining operation, first and second stage operations are repeated, so as to form a lining having a necessary thickness and strength. Although the same kind of plastics is stored in both tanks 11 and 11a, plastics in both tanks may be different from each other.

Referring to FIG. 2 showing another embodiment of the present invention, the same parts as the system of FIG. 1 are identified by the same reference numerals as FIG. 1. In the system, only one tank 11 is provided and viscosity of plastics in the tank is changed by controlling the heater 13 from a high viscosity to a lower viscosity. A pipe 30 after the head 9 is connected to one of ports of a directional control valve 31 having four ports. Other two ports of the valve 31 are connected to both ends of the pipeline A by pipes 32 and 33, and another port is connected to valves 21a and 21b by a pipe 34. In this system, the direction of carrier air flow can be inverted by operating the valve 31.

Various operations for lining the pipeline will be described hereinafter.

(a) At the first stage, the directional control valve 31 is positioned as shown in FIG. 3 and mist of plastics having a low viscosity is carried through the pipeline A by the carrier air to form a first liner B. This operation may be repeated, if necessary. At the second stage, the valve 31 is operated to the position of FIG. 4 and mist of plastics having a high viscosity is sent into the pipeline A in the opposite direction to form a second liner C. This operation may also be repeated.

(b) At the first stage, plastics mist having a low viscosity is sent to a pipeline in the direction of FIG. 3 and then the plastics mist is sent in the opposite direction shown in FIG. 4. At the second stage, plastics mist of high viscosity is carried through the pipeline in alternate directions.

(c) At the first stage, plastics mist of low viscosity and plastics mist of high viscosity are sequentially sent to the pipeline. At the second stage, such mists are sequentially sent in the opposite direction.

In accordance with the second embodiment of the present invention, since the mist of plastics is carried by carrier air in the opposite direction at every stage, a liner having uniform thickness can be formed in the pipeline.

While the presently preferred embodiment of the present invention has been shown and described, it is to be understood that this disclosure is for the purpose of illustration and that various changes and modifications may be made without departing from the spirit and scope of the invention as set forth in the appended claims. What is claimed is:

1. A method for lining pipes of a pipeline comprising:
   connecting an end opening of the pipeline to a compressor and connecting the other end of the pipeline to a vacuum generator;
   at a first stage, supplying mist of plastics having a low viscosity into the pipeline;
   producing a carrier air flow in the pipeline at a low pressure by said compressor and vacuum generator;
   at the next stage, supplying mist of plastics having a high viscosity into the pipeline; and
   producing carrier air flow in the pipeline at a high pressure.
2. The method according to claim 1, wherein said steps of lining are performed at a plurality of stages.
3. The method according to claim 1 further comprising inverting the direction of the carrier air flow at every stage.

* * * * *